US010857833B2

(12) United States Patent
Patmore et al.

(10) Patent No.: US 10,857,833 B2
(45) Date of Patent: Dec. 8, 2020

(54) CASTER ASSEMBLY WITH BRAKE ASSEMBLY HAVING LOW ACTUATION FORCE

(71) Applicant: Stryker Corporation, Kalamazoo, MI (US)

(72) Inventors: Kevin M. Patmore, Portage, MI (US); Roger A. Graves, III, Kalamazoo, MI (US); Adam Alexander, Kalamazoo, MI (US); Shawn Trimble, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 16/418,037

(22) Filed: May 21, 2019

(65) Prior Publication Data
US 2019/0358998 A1 Nov. 28, 2019

Related U.S. Application Data

(60) Provisional application No. 62/675,296, filed on May 23, 2018, provisional application No. 62/778,525, filed on Dec. 12, 2018.

(51) Int. Cl.
*B60B 33/00* (2006.01)
*F16D 49/00* (2006.01)
(Continued)

(52) U.S. Cl.
CPC ...... *B60B 33/0081* (2013.01); *B60B 33/0039* (2013.01); *B60B 33/0049* (2013.01);
(Continued)

(58) Field of Classification Search
CPC . Y10T 16/195; Y10T 16/196; B60B 33/0028; B60B 33/0055; B60B 33/0094;
(Continued)

(56) References Cited

U.S. PATENT DOCUMENTS 3,911,525 A  10/1975  Haussels
3,980,159 A   9/1976  Baxendale
(Continued)

FOREIGN PATENT DOCUMENTS

| DE | 2721375 A1 | 11/1978 |
|----|------------|---------|
| GB | 2033742 A  | 5/1980  |
| JP | 2003025805 A * | 1/2003 |

OTHER PUBLICATIONS

English language abstract and machine-assisted English translation for DE 27 21 375 extracted from espacenet.com database on Jun. 10, 2019, 9 pages.

*Primary Examiner* — Chuck Y Mah
(74) *Attorney, Agent, or Firm* — Howard & Howard Attorneys PLLC

(57) ABSTRACT

A caster assembly comprises a caster wheel having an outer surface. A wheel support is coupled to the wheel to support the wheel for rotation about a rotational axis and for swiveling about a swivel axis. A brake assembly comprises a brake having a cammed wheel engaging surface shaped to engage the outer surface of the wheel and a brake actuator to move the brake relative to the wheel from an unbraked position to a braked position in which the brake limits rotation of the wheel about the rotational axis. The cammed wheel engaging surface is arranged to articulate relative to the wheel support. The cammed wheel engaging surface articulates relative to the wheel support in response to the wheel rotating about the rotational axis after the brake is initially placed in the braked position such that the cammed wheel engaging surface more deeply engages the wheel with rotation of the wheel about the rotational axis.

20 Claims, 16 Drawing Sheets

(51) Int. Cl.
  *F16D 65/42* (2006.01)
  *F16D 121/14* (2012.01)
  *F16D 125/32* (2012.01)
(52) U.S. Cl.
  CPC ...... *B60B 33/0057* (2013.01); *B60B 33/0068* (2013.01); *B60B 33/0073* (2013.01); *F16D 49/00* (2013.01); *F16D 65/42* (2013.01); *B60B 2200/242* (2013.01); *B60B 2900/531* (2013.01); *F16D 2121/14* (2013.01); *F16D 2125/32* (2013.01)
(58) Field of Classification Search
  CPC ............ B60B 33/0039; B60B 33/0049; B60B 33/0057; B60B 33/0068; B60B 33/0081; B60B 33/0084; B60B 33/0092; B60B 33/025; B60B 33/021; B60B 33/0042; B60B 33/0073; B60B 33/0078; B60B 33/0086; B60B 37/10; B60B 2200/222; B60B 2200/242; B60B 2900/531; F16D 49/00; F16D 65/42; F16D 2121/14; F16D 2125/32; A61G 7/0528
  See application file for complete search history.

(56) References Cited

U.S. PATENT DOCUMENTS

| | | | |
|---|---|---|---|
| 4,414,702 A | 11/1983 | Neumann | |
| 4,722,114 A * | 2/1988 | Neumann | B60B 33/021 16/35 R |
| 4,749,064 A | 6/1988 | Jinno et al. | |
| 4,887,830 A | 12/1989 | Fought et al. | |
| 4,987,978 A | 1/1991 | Jungersen | |
| 5,029,674 A | 7/1991 | Boyes et al. | |
| 5,185,373 A * | 2/1993 | Motola | A61K 9/0014 514/570 |
| 5,263,226 A | 11/1993 | Roy et al. | |
| 5,303,450 A | 4/1994 | Lange | |
| 5,774,936 A * | 7/1998 | Vetter | B60B 33/021 16/35 R |
| 6,321,878 B1 | 11/2001 | Mobley et al. | |
| 6,336,524 B1 | 1/2002 | Van Loon et al. | |
| 6,834,746 B1 | 12/2004 | Lin | |
| 7,182,178 B2 * | 2/2007 | Chung | B60B 33/0018 188/1.12 |
| 7,506,404 B2 | 3/2009 | Block et al. | |
| 7,614,115 B2 | 11/2009 | Yan | |
| 7,810,613 B2 | 10/2010 | Lin | |
| 7,810,822 B2 | 10/2010 | Figel et al. | |
| 7,926,145 B2 | 4/2011 | Liao | |
| 8,079,606 B2 | 12/2011 | Dull et al. | |
| 8,220,110 B1 | 7/2012 | Chen | |
| 8,789,662 B2 * | 7/2014 | Childs | A61G 7/0528 16/35 R |
| 9,139,044 B1 | 9/2015 | Tsai | |
| 10,118,440 B1 | 11/2018 | Schenk et al. | |
| 2003/0226719 A1 | 12/2003 | Yeager | |
| 2007/0056141 A1* | 3/2007 | Armano | B60B 33/0073 16/35 R |
| 2008/0120810 A1 | 5/2008 | Reckelhoff et al. | |
| 2009/0019670 A1* | 1/2009 | Tsai | B60B 33/0081 16/35 R |
| 2012/0255141 A1* | 10/2012 | Lin | B60B 33/0081 16/45 |
| 2013/0111664 A1 | 5/2013 | Childs et al. | |
| 2013/0227817 A1* | 9/2013 | Block | B60B 33/0021 16/35 R |
| 2018/0042796 A1 | 2/2018 | Gingras et al. | |

* cited by examiner

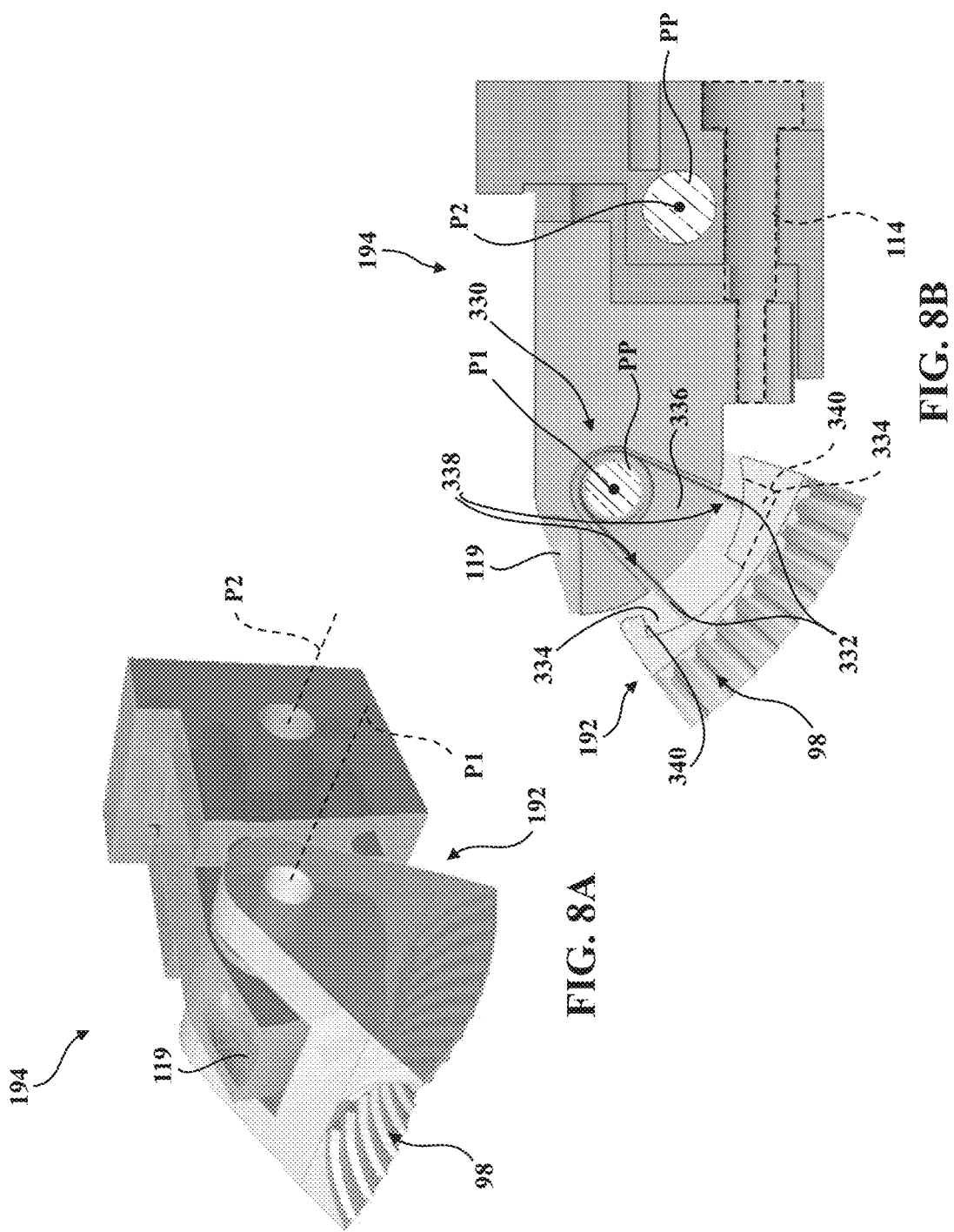

CASTER ASSEMBLY WITH BRAKE ASSEMBLY HAVING LOW ACTUATION FORCE

RELATED APPLICATIONS

This application claims priority to and the benefit of U.S. Provisional Patent Application No. 62/675,296, filed on May 23, 2018 and U.S. Provisional Patent Application No. 62/778,525, filed on Dec. 12, 2018, both of which are hereby incorporated herein by reference.

BACKGROUND

Caster wheels mobilize a patient transport apparatus for movement along a floor surface. Brake assemblies inhibit rolling of the caster wheels when desirable. A typical brake assembly requires a high actuation force to substantially deform an outer surface of the caster wheel so that a suitable braking force is provided. Further, when multiple caster wheels are included in a patient transport apparatus, a linkage is often employed to operatively couple all of the brake assemblies together so that actuation of one foot pedal actuates all of the brake assemblies simultaneously. Owing to this simultaneous actuation of the brake assemblies on a typical patient transport apparatus, and the high forces required to provide suitable braking, users sometimes find actuating the foot pedal difficult.

A caster assembly is desired that addresses one or more of the aforementioned challenges.

BRIEF DESCRIPTION OF THE DRAWINGS

FIG. 8A is a perspective view of components of another brake assembly of the caster assembly.

FIG. 8B is a cross-sectional view of the brake assembly of FIG. 8A.

DETAILED DESCRIPTION

Figure 1:
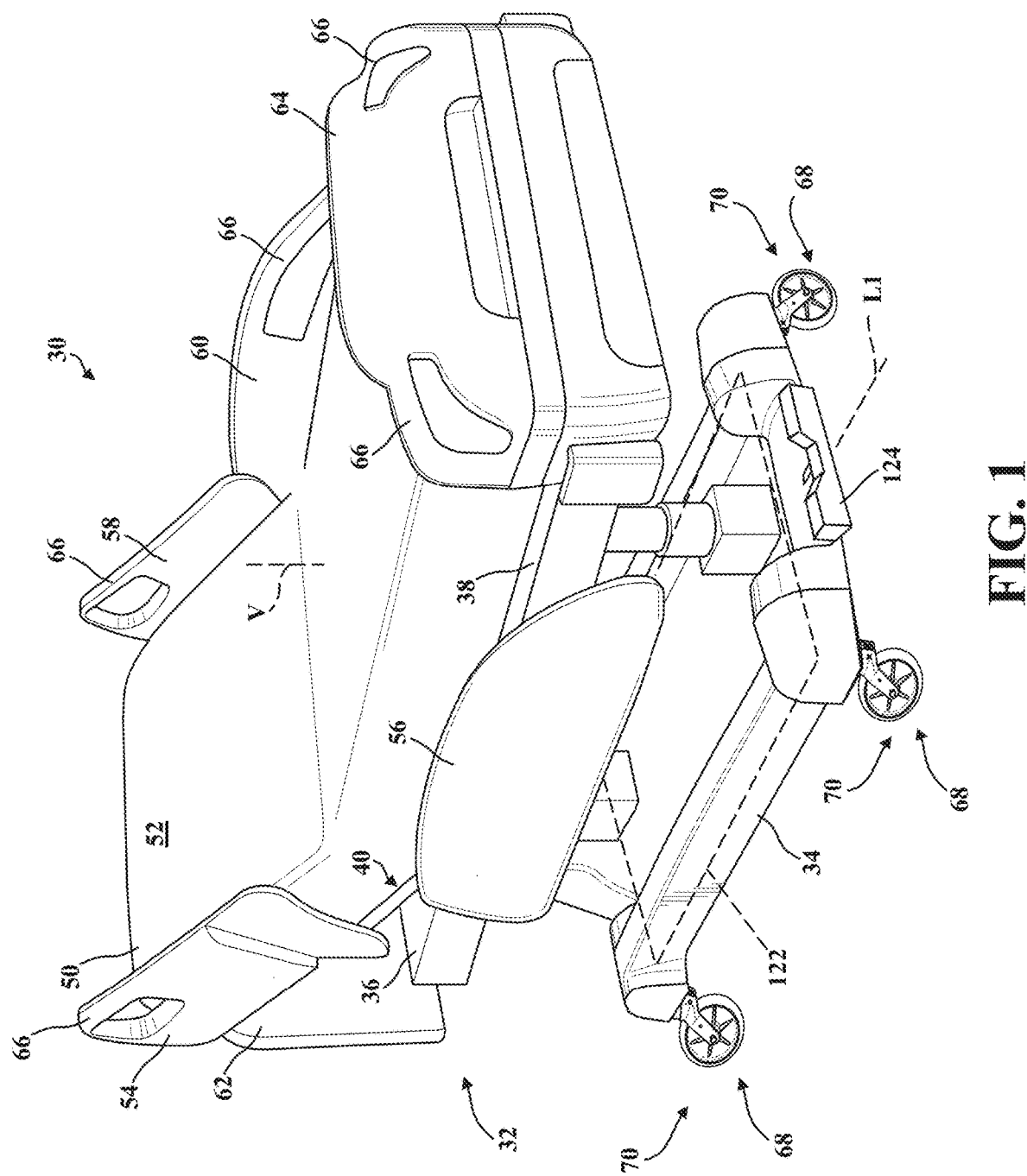
FIG. 1 is a perspective view of a patient transport apparatus.

Referring to FIG. 1, a patient transport apparatus 30 is shown for supporting a patient in a health care setting. The patient transport apparatus 30 illustrated in FIG. 1 comprises a hospital bed. In other embodiments, however, the patient transport apparatus 30 may comprise a stretcher, cot, wheelchair, chair, or similar apparatus utilized in the care of a patient.

A support structure 32 provides support for the patient. The support structure 32 illustrated in FIG. 1 comprises a base 34 and a support frame 36 disposed above the base 34 and supported by the base 34. The support structure 32 also comprises a patient support deck 38 disposed on the support frame 36. The patient support deck 38 comprises sections, some of which are capable of articulating (e.g., pivoting) relative to the support frame 36. The patient support deck 38 provides a patient support surface 40, upon which the patient is supported.

A mattress 50 is disposed on the patient support deck 38 during use. The mattress 50 comprises a secondary patient support surface 52 upon which the patient is supported. The mattress 50 may be omitted in certain embodiments, such that the patient rests directly on the patient support surface 40. The base 34, support frame 36, patient support deck 38, and patient support surfaces 40, 52, each comprise a head end and a foot end corresponding to designated placement of the patient's head and feet on the patient transport apparatus 30. The base 34 comprises a longitudinal axis L1 along its length from the head end to the foot end. The base 34 also comprises a vertical axis V arranged crosswise (e.g., perpendicularly) to the longitudinal axis L1 along which the support frame 36 is lifted and lowered relative to the base 34. The construction of the support structure 32 may take on any known or conventional design, and is not limited to that specifically set forth above. For example, the support structure 32 may be like that shown in U.S. Patent Application Pub. No. 2013/0111664 to Childs et al., filed on Aug. 14, 2012, entitled, "Wheeled Carriage With Brake Lock System," which is hereby incorporated herein by reference.

Patient barriers, such as side rails 54, 56, 58, 60 are coupled to the support frame 36 and/or patient support deck 38 and are thereby supported by the base 34. If the patient transport apparatus 30 is a stretcher or a cot, there may be fewer side rails.

A headboard 62 and a footboard 64 are coupled to the support frame 36. The headboard 62 and footboard 64 may be coupled to any location on the patient transport apparatus 30, such as the support frame 36 or the base 34.

Caregiver interfaces 66, such as handles, are shown integrated into the footboard 64 to facilitate movement of the patient transport apparatus 30 over a floor surface F. Additional caregiver interfaces 66 may be integrated into other components of the patient transport apparatus 30, such as the headboard 62 or the side rails 54, 56, 58, 60. The caregiver interfaces 66 are graspable by the caregiver to manipulate the patient transport apparatus 30 for movement, and the like. Other forms of the caregiver interface 66 are also contemplated.

Figure 2:
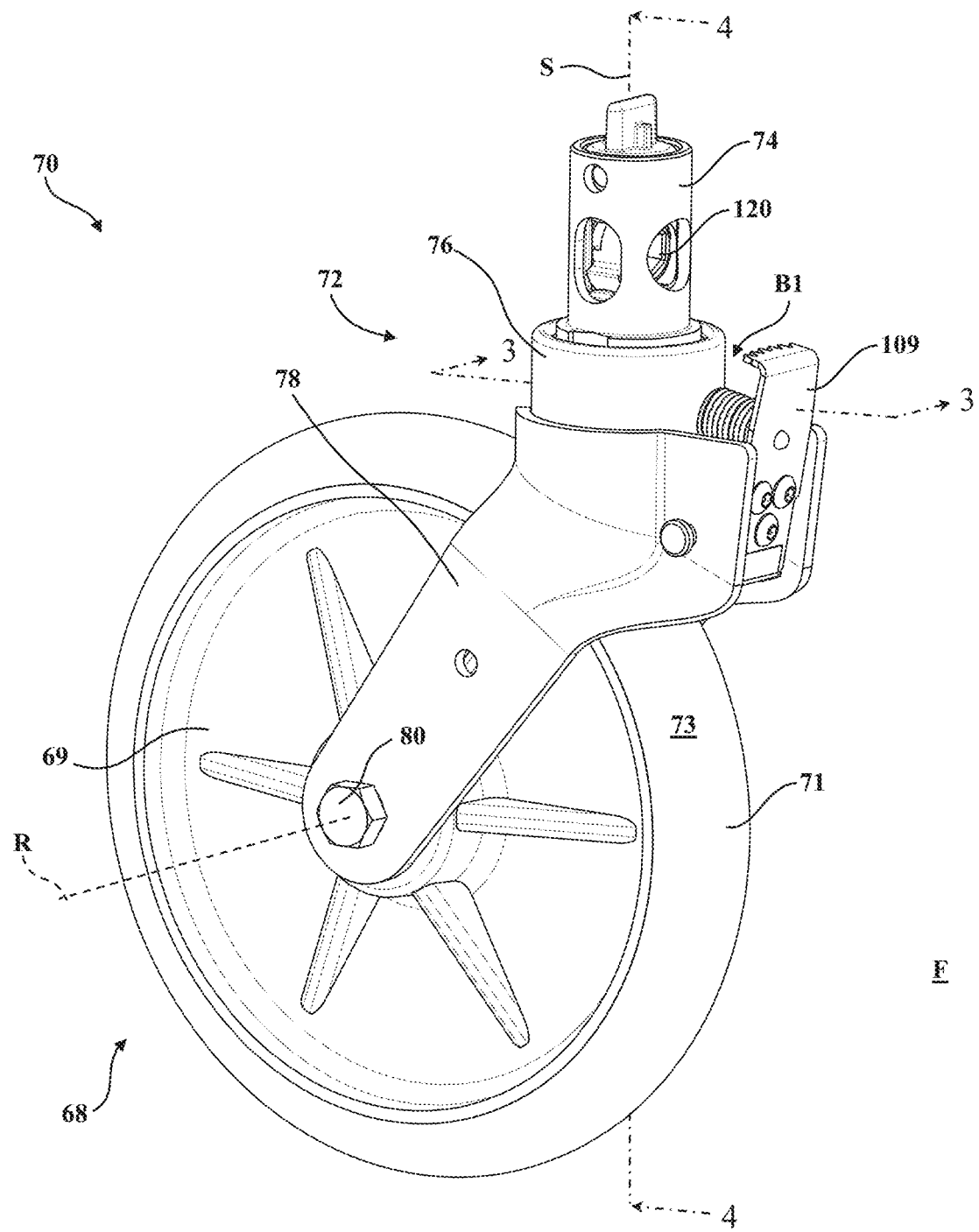
FIG. 2 is a perspective view of a caster assembly.

Referring to FIGS. 1 and 2, wheels 68 are coupled to the base 34 to facilitate transport over the floor surface F. The wheels 68 are arranged in each of four quadrants of the base 34 adjacent to corners of the base 34. In the embodiment shown, the wheels 68 are caster wheels able to rotate and swivel relative to the support structure 32 during transport. Each of the wheels 68 forms part of a caster assembly 70. Each caster assembly 70 is mounted to the base 34. Additional wheels are also contemplated. For example, the patient transport apparatus 30 may comprise four non-powered caster wheels 68, along with one or more powered wheels. It should be appreciated that although the caster assembly 70 is shown and described as being part of the patient transport apparatus 30, the caster assembly 70 could be used with any mobility apparatus in which caster wheels are suitable for providing mobility.

Referring to FIG. 2, in one embodiment, each of the wheels 68 comprises a wheel hub 69 and an outer wheel portion 71 surrounding the wheel hub 69. The outer wheel portion 71 has an outer surface 73, at least part of which is arranged to contact the floor surface F when rolling along the floor surface F. The wheel hub 69 may also be referred to as a wheel center, wheel rim, or the like. The outer wheel portion 71 may also be referred to as a tire, tread, etc. In some embodiments, the outer wheel portion 71 comprises a first material and the wheel hub 69 comprises a second material, wherein the first material is different than the second material. The first material may be softer than the second material, and have a higher coefficient of friction (static and/or dynamic) to provide suitable frictional engagement during braking, described further below. The first material also provides the wheel 68 with suitable grip on the floor surface F. The first material comprises, consists essentially of, or consists of, the first material, which may be a polymer. In many embodiments, the first material is selected from elastomers, thermoplastic elastomers, thermoplastics, and combinations thereof. Other first materials are also contemplated. Various non-limiting examples of suitable elastomers include natural rubber (natural polyisoprene), synthetic polyisoprene, polybutadiene, chloroprene rubber, butyl rubber, halogenated butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, fluoroelastomer, perfluoroelastomer, polyether block amides, chlorosulfonated polyethylene, and ethylene-vinyl acetate. For example, in one specific non-limiting embodiment, the first material comprises polyamide. Various non-limiting examples of suitable thermoplastics and thermoplastic elastomers include polyolefins, polyolefin elastomers, polyvinylchlorides (PVC), polyamides (PA), styrenic elastomers, thermoplastic vulcanate elastomer (TPV), fluoropolymers, silicones, polyesters, polyoxymethylenes (POM), polyurethane, thermoplastic polyurethanes (TPU), and combinations thereof. For example, in one specific embodiment, the first material comprises thermoplastic polyurethane, polyoxymethylene, polyalkylene terephthalate, and combinations thereof. By way of a non-limiting example, the first material comprises polyurethane or a thermoplastic polyurethane (TPU).

Figures 3, 3A:
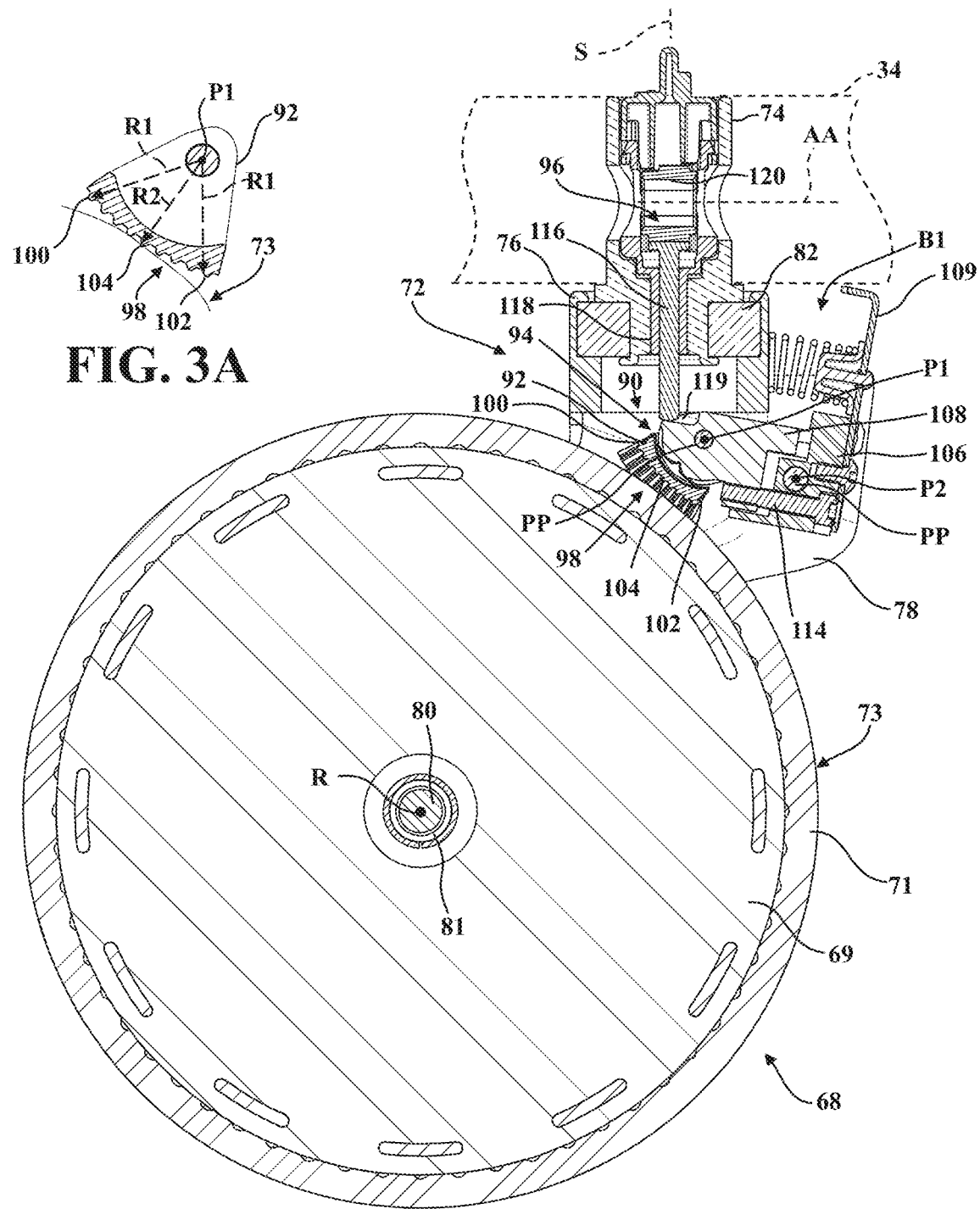
FIG. 3 is a cross-sectional view of the caster assembly of FIG. 2 taken along the line 3-3 in FIG. 2.
FIG. 3A is an illustration of a brake having a cammed wheel engaging surface.
Figure 4:
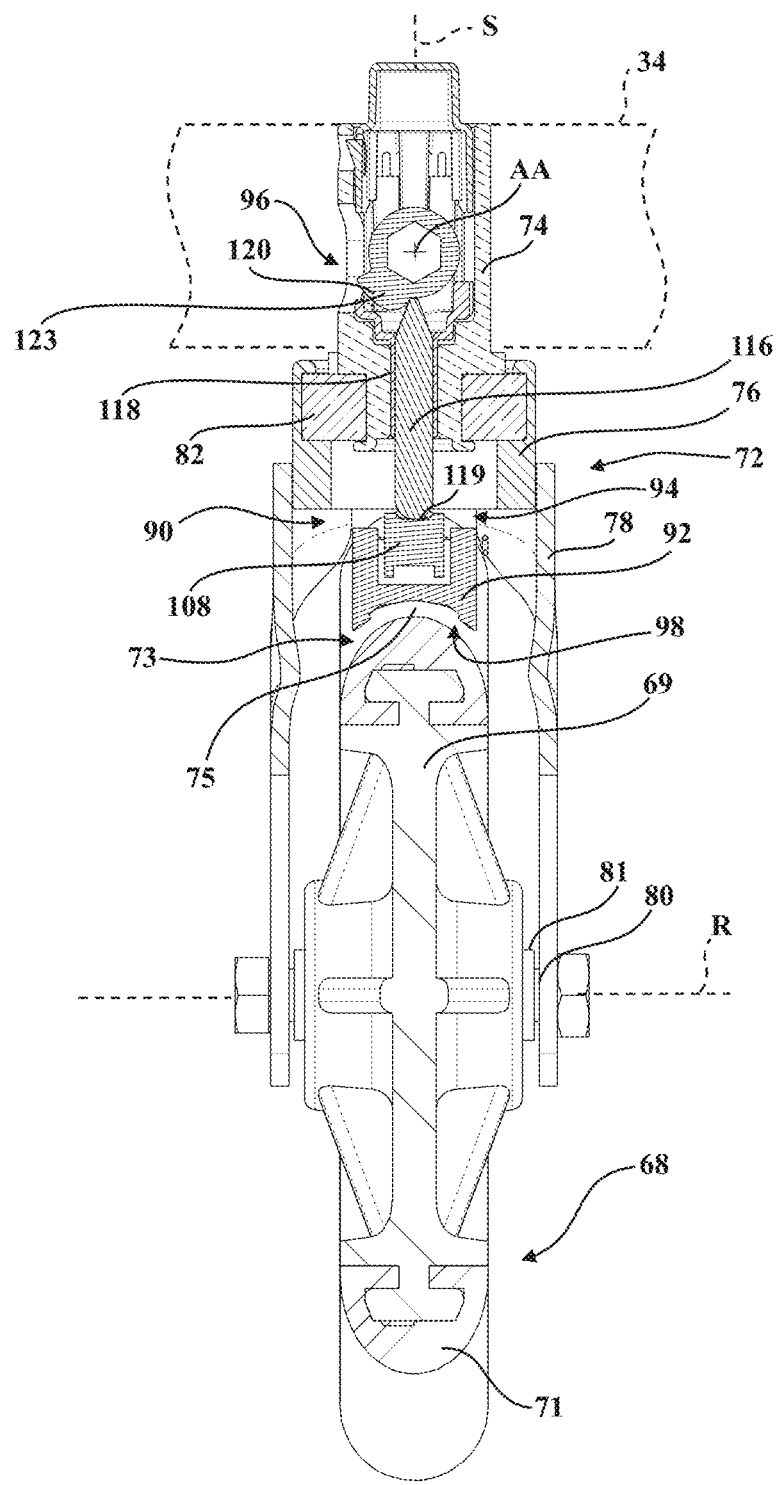
FIG. 4 is a cross-sectional view of the caster assembly of FIG. 2 taken along the lines 4-4 in FIG. 2.

Referring to FIGS. 2-4, the caster assembly 70 further comprises a wheel support 72 and a caster stem 74. The wheel support 72 is arranged to support the wheel 68 for rotation about a rotational axis R and for swiveling about a swivel axis S. The wheel support 72 may comprise various types of support structures. In the embodiment shown, the wheel support 72 comprises a fork 78 and a neck 76 fixed to the fork 78. The wheel 68 is secured to the fork 78 via an axle 80 passing through the wheel hub 69. The axle 80 is attached to the fork 78. The wheel 68 is arranged to rotate about the rotational axis R defined by the axle 80. The wheel 68 may rotate relative to the axle 80 via a wheel bearing 81 (see FIG. 3) or, in alternative embodiments, the wheel 68 may be fixed to the axle 80 to rotate with the axle 80 relative to the fork 78. Other configurations that allow the wheel 68 to rotate about the rotational axis R and roll along the floor surface F are contemplated.

Referring to FIGS. 3 and 4, the stem 74 is fixed to the base 34 of the patient transport apparatus 30 such that the stem 74 is unable to swivel or otherwise move relative to the base 34. The neck 76 is coupled to the stem 74 via a bearing 82 so that the neck 76 is able to swivel relative to the stem 74 about the swivel axis S when the wheel 68 is changing orientation. Owing to the fixed connection between the neck 76 and the fork 78, the fork 78 and wheel 68 are also able to swivel relative to the stem 74 about the swivel axis S. Fasteners, press-fit connections, welding, and/or other structures may be present to secure the stem 74 to the base 34, as is conventional in the art. The stem 74 may also be referred to as a kingpin, spindle, post, or the like. Additionally, a collar, sleeve, or other suitable structure may be fixed to the stem 74 and located between the stem 74 and the base 34 to further support the stem 74. In the embodiment shown, the stem 74 and the neck 76 form one type of swivel assembly that provides a swivel joint for the caster assembly 70. Other swivel assemblies that allow the wheel 68 to swivel relative to the base 34 are also possible.

The caster assembly 70 further comprises a brake assembly 90 to facilitate braking of the wheel 68 about the rotational axis R. The brake assembly 90 may also operate to inhibit swiveling of the wheel 68 about the swivel axis S. The brake assembly 90 comprises a brake 92 pivotally supported by a brake shoe 94 about a first pivot axis P1 and a brake actuator 96 to move the brake 92 from an unbraked position to a braked position about a second pivot axis P2. The brake shoe 94 is pivotally coupled to the wheel support 72 about the second pivot axis P2 such that the brake 92 pivots with the brake shoe 94 about the second pivot axis P2 when moved from the unbraked position to the braked position via the brake actuator 96.

Referring to FIG. 3A, the brake 92 has a cammed wheel engaging surface 98 shaped to engage the outer surface 73 of the wheel 68 in the braked position. The cammed wheel engaging surface 98 comprises opposing cammed sections 100, 102 located at a first distance R1 from the first pivot axis P1 and an initial contact section 104 located at a second distance R2 from the first pivot axis P1. The second distance R2 is less than the first distance R1 thereby creating a cammed profile for the cammed wheel engaging surface 98. The cammed sections 100, 102 may be defined as the front and rear ends of the brake 92 with the initial contact section 104 being a middle of the brake 92 between the ends, or the cammed sections 100, 102 may extend partially inboard from the front and rear ends with the initial contact section 104 defined between the cammed sections 100, 102. In this case, the distances R1, R2 may be average distances or may be the maximum distance from the first pivot axis P1. Notably, the cammed profile is shown as being arcuate in the embodiment shown, but may be flat in other embodiments, and may assume any shape suitable to provide a cammed profile with respect to the first pivot axis P1. The brake 92 is shown in the form of a brake pad, but could be any suitable braking element capable of inhibiting rotation of the wheel 68 in the manner described herein.

The cammed wheel engaging surface 98 is shown with a corrugated pattern having a plurality of ridges that first engage the outer surface 73 of the wheel 68. In other versions, the cammed wheel engaging surface 98 may be smooth, knurled, coated, rough, undulating, or have other patterns suitable for making frictional contact with the outer surface 73. In one version, shown in FIG. 4, the cammed wheel engaging surface 98 has a central relief channel 75 shaped so that a crown of the outer wheel portion 71 avoids contact by the cammed wheel engaging surface 98 during braking, i.e., the cammed wheel engaging surface 98 instead contacts on opposed sides of the crown. In other versions, the brake 92 engages the crown. The brake 92 may be formed of any suitable material. In some versions, the brake 92 may be formed of different materials, such as a combination of metals, e.g., iron, copper, steel, and graphite. The brake 92 may also be formed of one or more polymeric materials in other embodiments. The brake 92 may comprise a single, unitary body, multiple bodies fixed together, or any suitable arrangement.

With continued reference to FIGS. 3 and 4, the brake actuator 96 may comprise any suitable component(s) capable of moving the brake 92 relative to the wheel 68 from the unbraked position to the braked position in which the brake 92 limits rotation of the wheel 68 about the rotational axis R. In the version shown, the brake actuator 96 comprises a plunger 116 slidable within the stem 74. The plunger 116 has a distal end that engages the brake shoe 94 in an elongated pocket 119 (see also FIG. 5) in the brake shoe 94. As the distal end of the plunger 116 is pushed distally, the brake shoe 94 is pivoted about the second pivot axis P2 until the brake 92 is placed in the braked position. A bushing sleeve 118 is shown located between the plunger 116 and the stem 74 to facilitate sliding motion of the plunger 116.

The brake actuator 96 further comprises a cam 120 having a cam profile shaped to engage the plunger 116 to move the plunger 116 upon rotation of the cam 120 about an actuation axis AA (best shown in FIG. 4). The cam profile has cam lobes corresponding to at least the braked and unbraked positions. When the lobe 123 corresponding to the braked position engages the plunger 116, the plunger 116 is actuated so that the distal end of the plunger 116 drives the brake shoe 94 (and the brake 92 being carried by it) to the braked position. The brake actuator 96 may be the same as that shown in U.S. Patent Application Pub. No. 2013/0111664 to Childs et al., filed on Aug. 14, 2012, entitled, "Wheeled Carriage With Brake Lock System," which is hereby incorporated herein by reference.

The cam 120 defines a hexagonal shaped opening for receiving a hex shaft of a brake linkage 122 (see FIG. 1) so that the brake linkage 122 can rotate the cam 120 about the actuation axis AA. The linkage 122 is coupled to a foot pedal 124 (see FIG. 1) that moves between engaged and disengaged positions (braked and unbraked). The foot pedal 124 may be pivoted by a user's foot to the engaged position, which operates through the linkage 122 to rotate the hex shaft and the cam 120 to place the brake assembly 90 in the braked position. The linkage 122 may be operatively coupled to all of the brake assemblies 90 (e.g., all four caster assemblies 70) so that operation of the foot pedal 124 to the engaged position operates to set all of the brake assemblies 90 to the braked position simultaneously. The foot pedal 124 and the linkage 122 may be the same as that shown in U.S. Patent Application Pub. No. 2013/0111664 to Childs et al., filed on Aug. 14, 2012, entitled, "Wheeled Carriage With Brake Lock System," which is hereby incorporated herein by reference. The caster assembly 70 may also comprise a swivel lock assembly to inhibit swiveling of all the wheels 68 upon actuation of the foot pedal 124 in addition to inhibiting rotation of all the wheels 68, as described in U.S. Patent Application Pub. No. 2013/0111664 to Childs et al., filed on Aug. 14, 2012, entitled, "Wheeled Carriage With Brake Lock System," which is hereby incorporated herein by reference.

Referring specifically to FIG. 3, a first biasing device B1 (e.g., a compression spring as shown, other resilient member, or the like) biases the brake shoe 94 (and the brake 92 being supported by it) to the unbraked position about the second pivot axis P2. During operation, the brake actuator 96 (e.g., cam 120 and plunger 116) places the brake 92 into the braked position by engaging the brake shoe 94 and pivoting the brake shoe 94 about the second pivot axis P2 against the biasing force of the first biasing device B1 until the brake 92 is in contact with the wheel 68. The first biasing device B1 is operatively coupled to the brake 92 by virtue of operating between the neck 76 and a plate 109 fixed to the brake shoe 94. The first biasing device B1 may be arranged as shown in U.S. Patent Application Pub. No. 2013/0111664 to Childs et al., filed on Aug. 14, 2012, entitled, "Wheeled Carriage With Brake Lock System," which is hereby incorporated herein by reference. Other arrangements of the first biasing device B1 are also possible to bias the brake shoe 94 toward the unbraked position.

Figure 5:
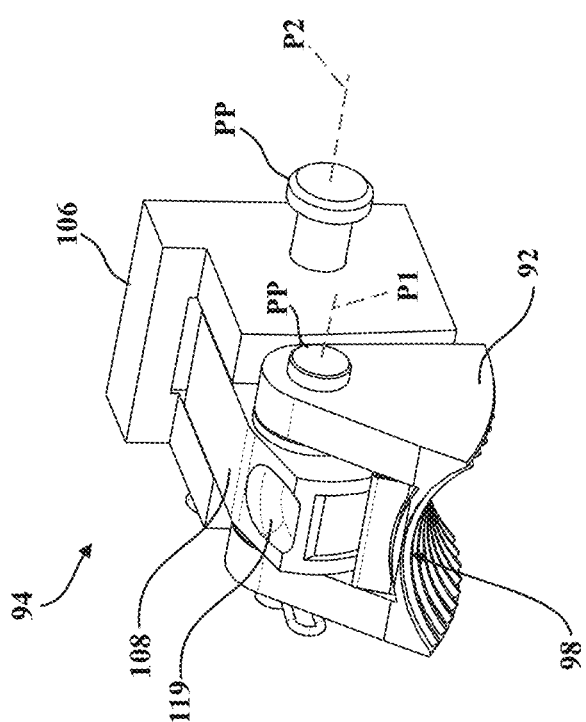
FIG. 5 is a perspective view of components of a brake assembly of the caster assembly.
Figure 6:
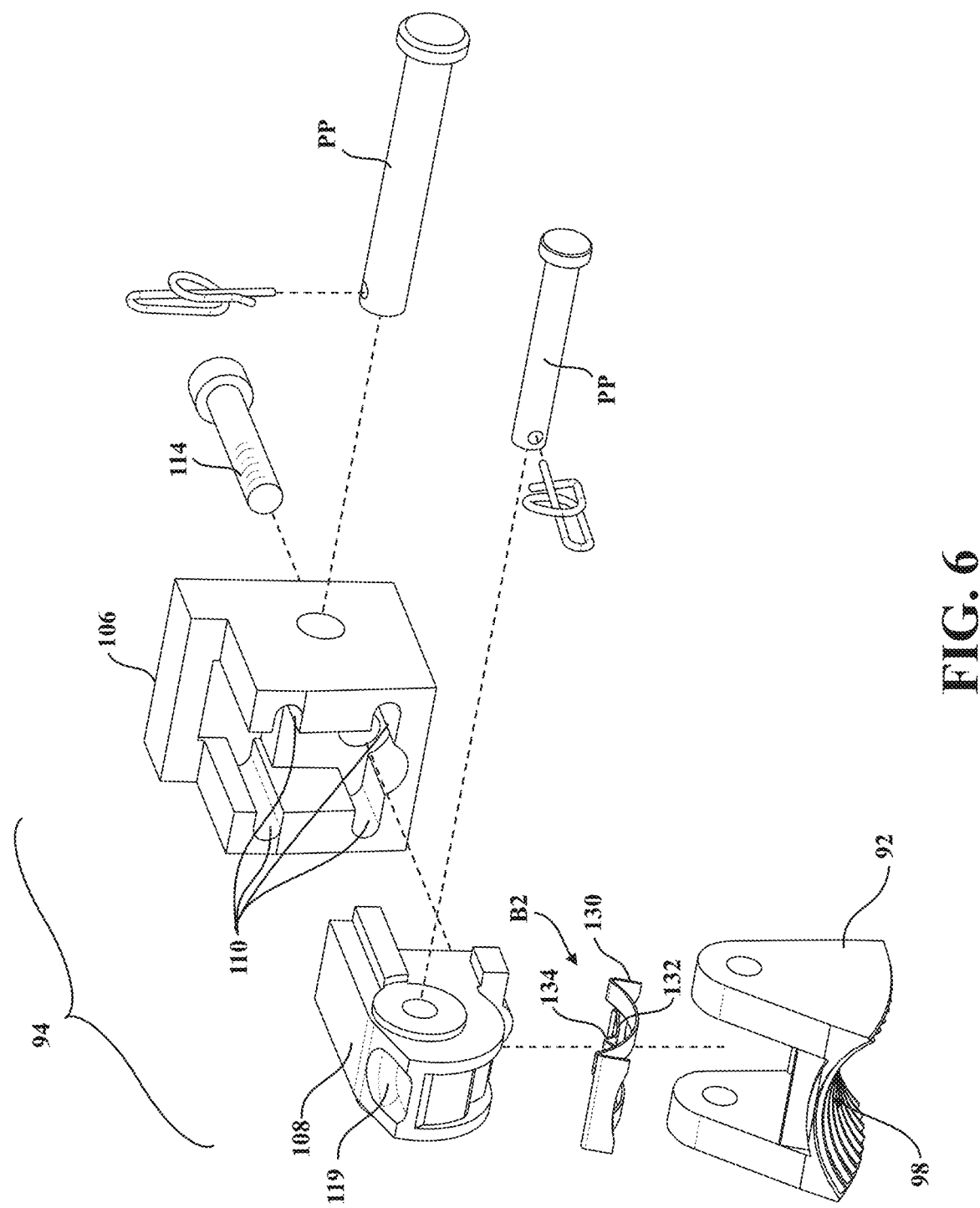
FIG. 6 is an exploded view of the components of FIG. 5.

Referring to FIGS. 5 and 6, the brake shoe 94 comprises a support block 106 and a carrier 108. The support block 106 is pivotally connected to the fork 78 of the wheel support 72 via a pivot pin PP that defines the second pivot axis P2 (see also FIG. 3). The carrier 108 is movably coupled to the support block 106. The carrier 108 carries the brake 92 and supports the brake 92 for pivoting about the first pivot axis P1 via another pivot pin PP that pivotally couples the brake 92 to the carrier 108. The carrier 108 is movable relative to the support block 106 to a plurality of brake adjustment positions. In the embodiment shown, the support block 106 defines one or more slide tracks 110 (See FIG. 6) along which the carrier 108 is slidably supported for adjustment to one of the plurality of brake adjustment positions. The carrier 108 is shaped to slidably mate with the support block 106 such that the carrier 108 is constrained from rotating relative to the support block 106 during adjustment.

A brake position adjuster adjusts the brake 92 and the brake shoe 94 to one of the plurality of brake adjustment positions. In one embodiment, the brake position adjuster comprises an adjustment bolt 114 that threadably engages the carrier 108 to set a position of the carrier 108 along the slide tracks 110. Referring to FIG. 3, the adjustment bolt 114 is axially constrained in the support block 106 (via a cover plate or the like), yet able to freely rotate in a throughbore in the support block 106, so that as the adjustment bolt 114 is rotated and threaded further into or out from a threaded bore in the carrier 108, the carrier 108 slides relative to the support block 106. Once the position of the carrier 108 is set relative to the support block 106, the adjustment bolt 114 may be further secured in place in the support block 106 via adhesive, a lock device, or the like. The adjustment bolt 114 and its operation may be like that described and shown in U.S. Patent Application Pub. No. 2013/0111664 to Childs et al., filed on Aug. 14, 2012, entitled, "Wheeled Carriage With Brake Lock System," which is hereby incorporated herein by reference.

Figure 6A:
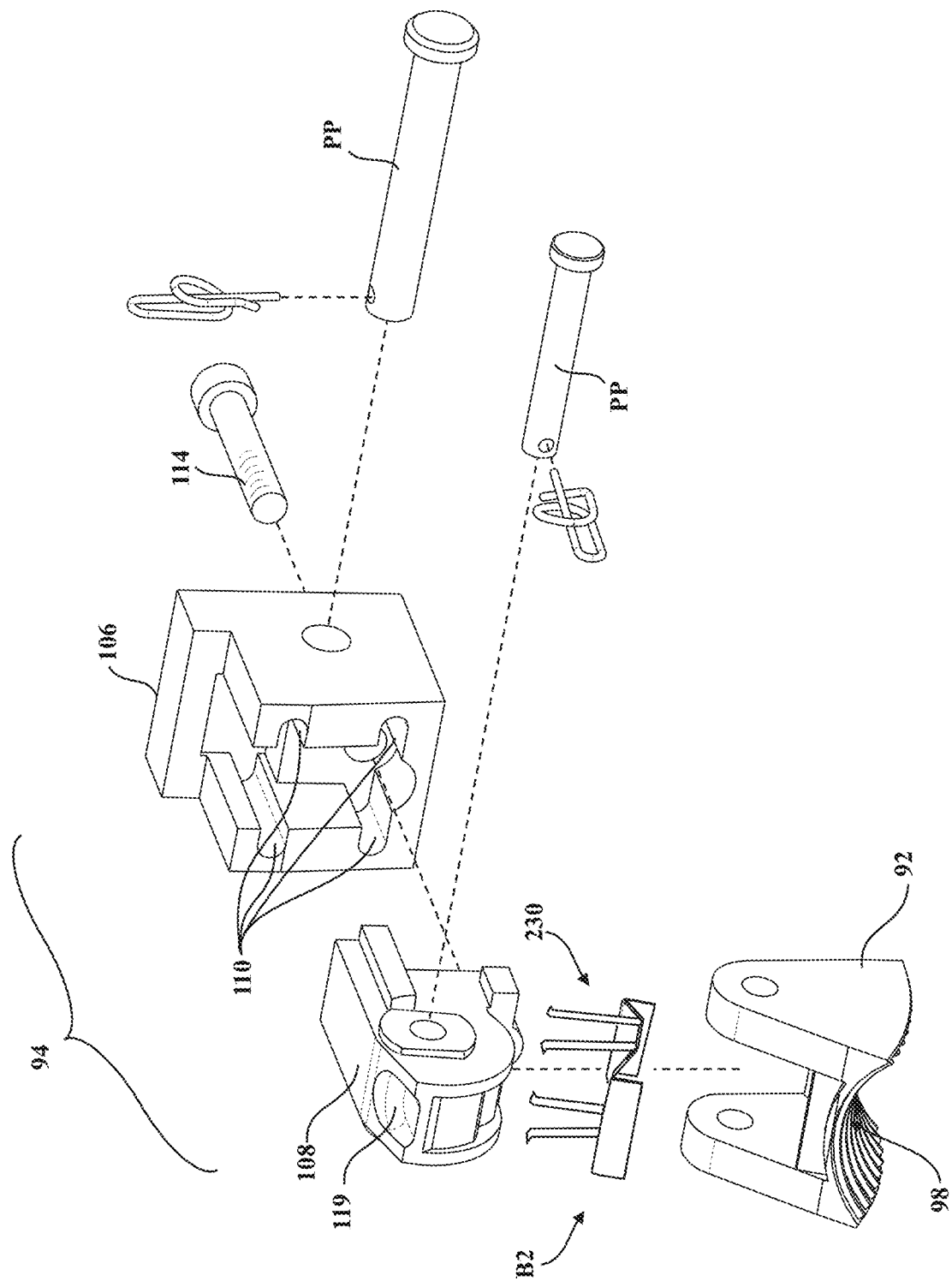
FIG. 6A is an exploded view of the components of FIG. 5 with an alternative return spring of the brake assembly.
Figure 7:
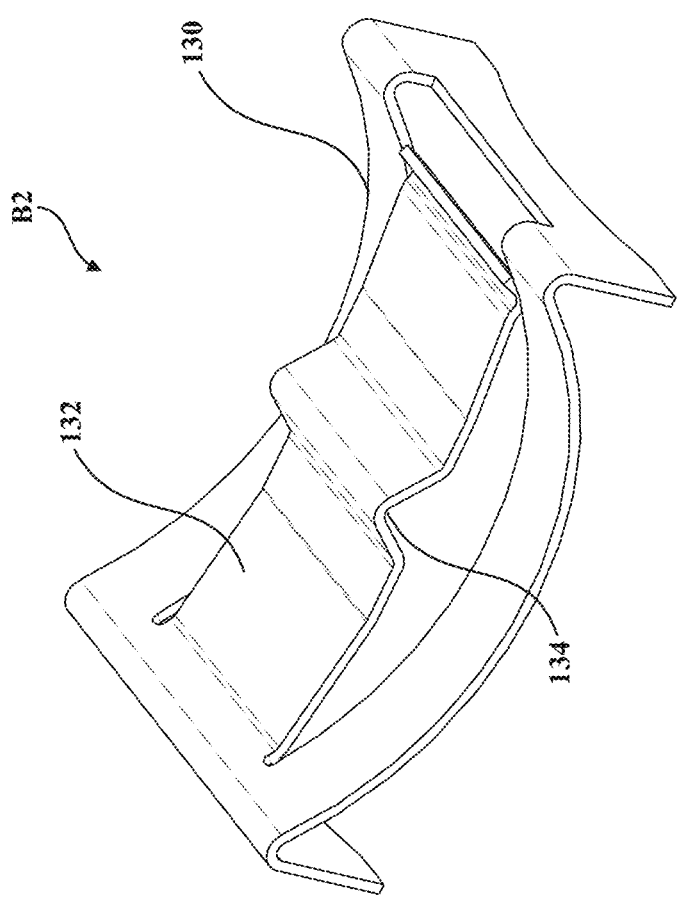
FIG. 7 is a perspective view of a return spring of the brake assembly.
Figure 7A:
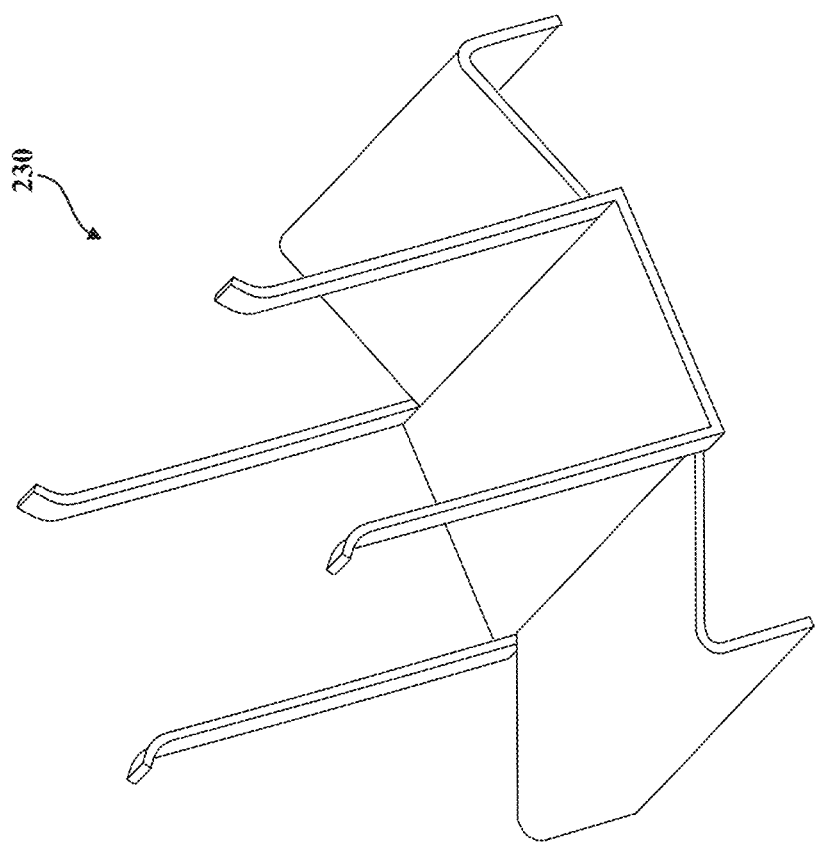
FIG. 7A is a perspective view of the alternative return spring of the brake assembly.
Figure 8:
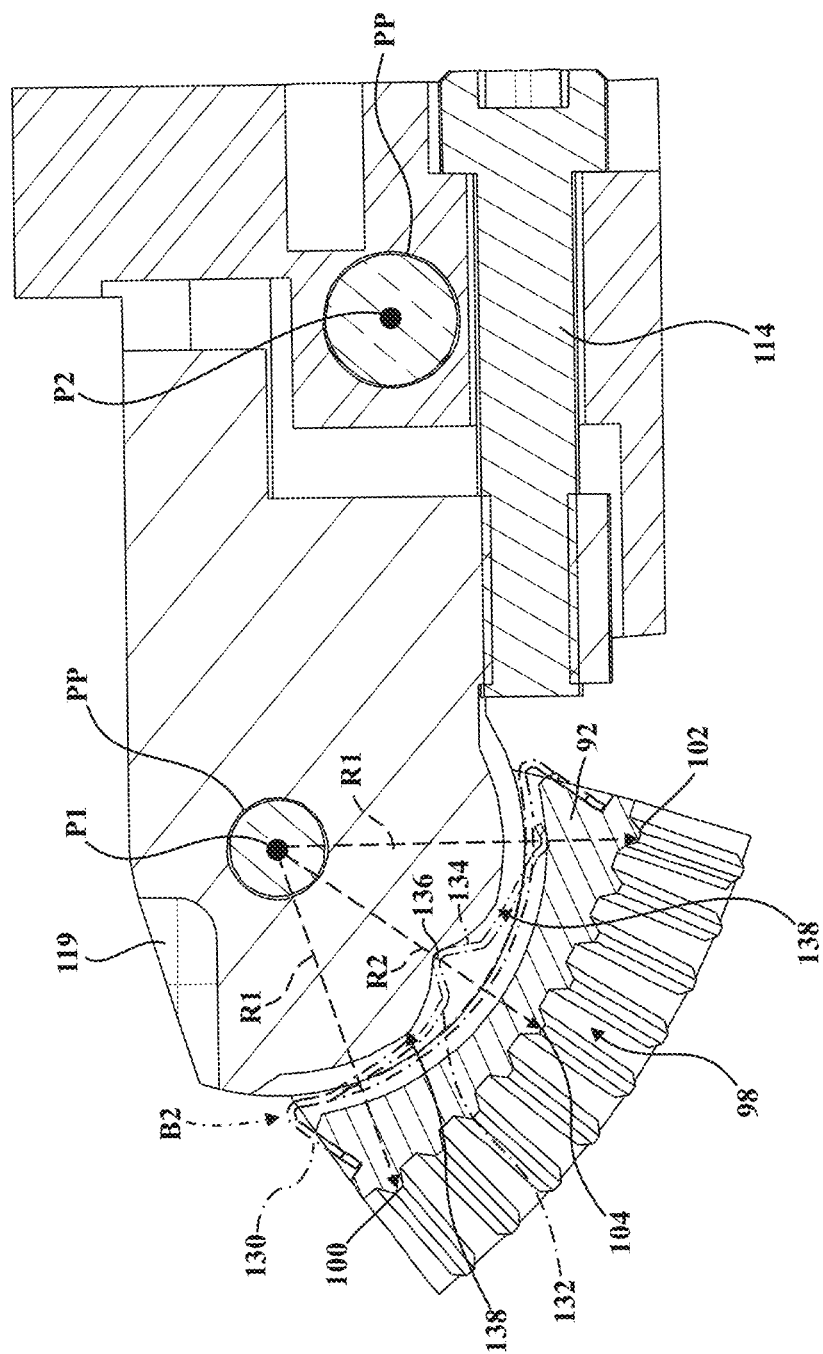
FIG. 8 is a cross-sectional view of the components of FIG. 5.

Referring to FIGS. 7 and 8, the brake assembly further comprises a second biasing device B2 to bias the brake 92 toward an initial position about the first pivot axis P1 relative to the brake shoe 94 (see FIG. 8). In the embodiment shown, the second biasing device B2 comprises a return spring 130 acting between the brake 92 and the brake shoe 94 to return the brake 92 to the initial position when unbraked. In particular, the return spring 130 has a detent spring lever 132 with a projection 134 shaped to mate with a corresponding detent pocket 136 in the brake shoe 94 when the brake 92 is in the initial position. The return spring 130 is carried by the brake 92 to pivot with the brake 92 upon the wheel 68 rotating further after initial braking occurs, as described further below. When this occurs, the detent spring lever 132 and its projection 134 ride along a cammed profile 138 of the brake shoe 94 that extends on either side of the detent pocket 136. This cammed profile 138, the shape of the projection 134, and the biasing force provided by the detent spring lever 132 are such that the projection 134 is biased toward the detent pocket 136. As a result, when the brake 92 is moved back to the unbraked position (e.g., via the biasing force of the first biasing device B1 when the cam 120 is moved to the unbraked position), the projection 134 returns to its normal position seated in the detent pocket 136. One alternative return spring 230 is also shown in FIGS. 6A and 7A. Other configurations are also possible.

Figure 8D:
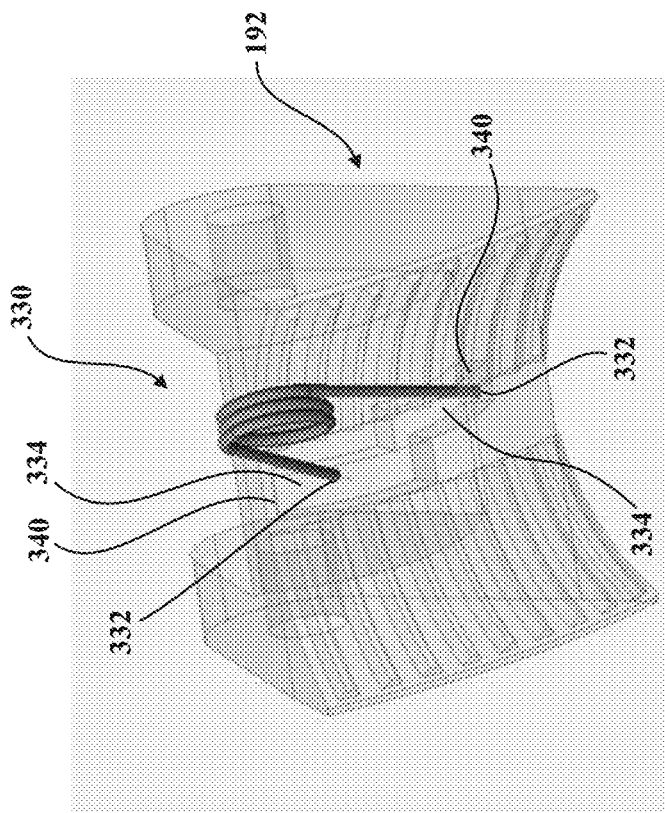
FIG. 8D is a perspective, transparent view further illustrating the alternative return spring of FIG. 8C.
Figure 8C:
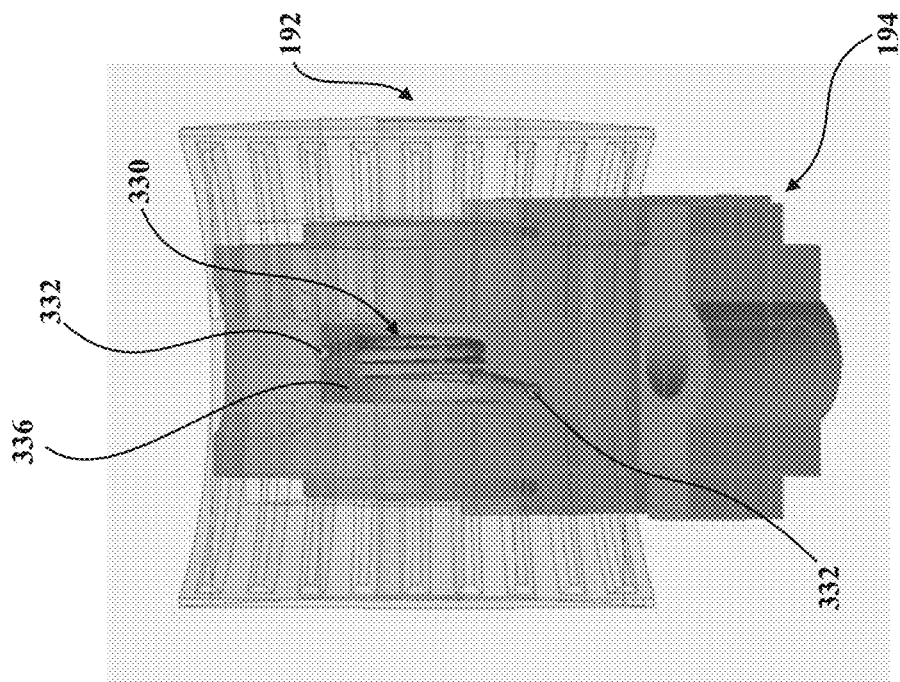
FIG. 8C is a perspective, transparent view illustrating another alternative return spring used in the brake assembly of FIG. 8A.

Referring to FIGS. 8A and 8B, another alternative return spring 330 is shown in conjunction with brake 192 and brake shoe 194, which are altered slightly from the above-described brake 92 and brake shoe 94, to accommodate the return spring 330. Yet, the alternative brake 192 and brake shoe 194 are arranged and operate in the same manner as the above-described brake 92 and brake shoe 94. In this version, return spring 330 is a torsion spring disposed about the pin PP. The return spring 330 acts between the brake 192 and the brake shoe 194 to return the brake 192 to the initial position when unbraked. In particular, the return spring 330 has opposing spring fingers 332 shaped to ride in channels 334 defined in the brake 192 (see also FIGS. 8C and 8D). In this version, the return spring 330 is carried by the brake shoe 194 and is disposed in a pocket 336 in the brake shoe 194. The pocket 336 is sized and shaped to accommodate the return spring 330 in its normal, unbiased state, and provide bearing surfaces 338 against which the opposing spring fingers 332 can bear to allow operation of the return spring 330.

During operation, when the brake 192 pivots relative to the brake shoe 194 upon the wheel 68 rotating further after initial braking occurs, the spring fingers 332 ride in their corresponding channels 334 until one of the spring fingers 332 engages a wall 340 at an end of its channel 334. The particular spring finger 332 that engages the wall 340 depends on the direction that the brake 192 pivots—one spring finger 332 is provided for each of the two directions. Once the spring finger 332 engages the wall 340, further pivoting of the brake 192 relative to the brake shoe 194 loads the torsion spring, which then applies a biasing force against the brake 192, owing to the opposing spring fingers 332 bearing against the bearing surface 338 on the brake shoe 194 and the wall 340 on the brake 192. As a result, when the brake 192 is moved back to the unbraked position (e.g., via the biasing force of the first biasing device B1 when the cam 120 is moved to the unbraked position), the spring fingers 332 return to their normal state urging the brake 192 toward the initial position.

Figure 9A:
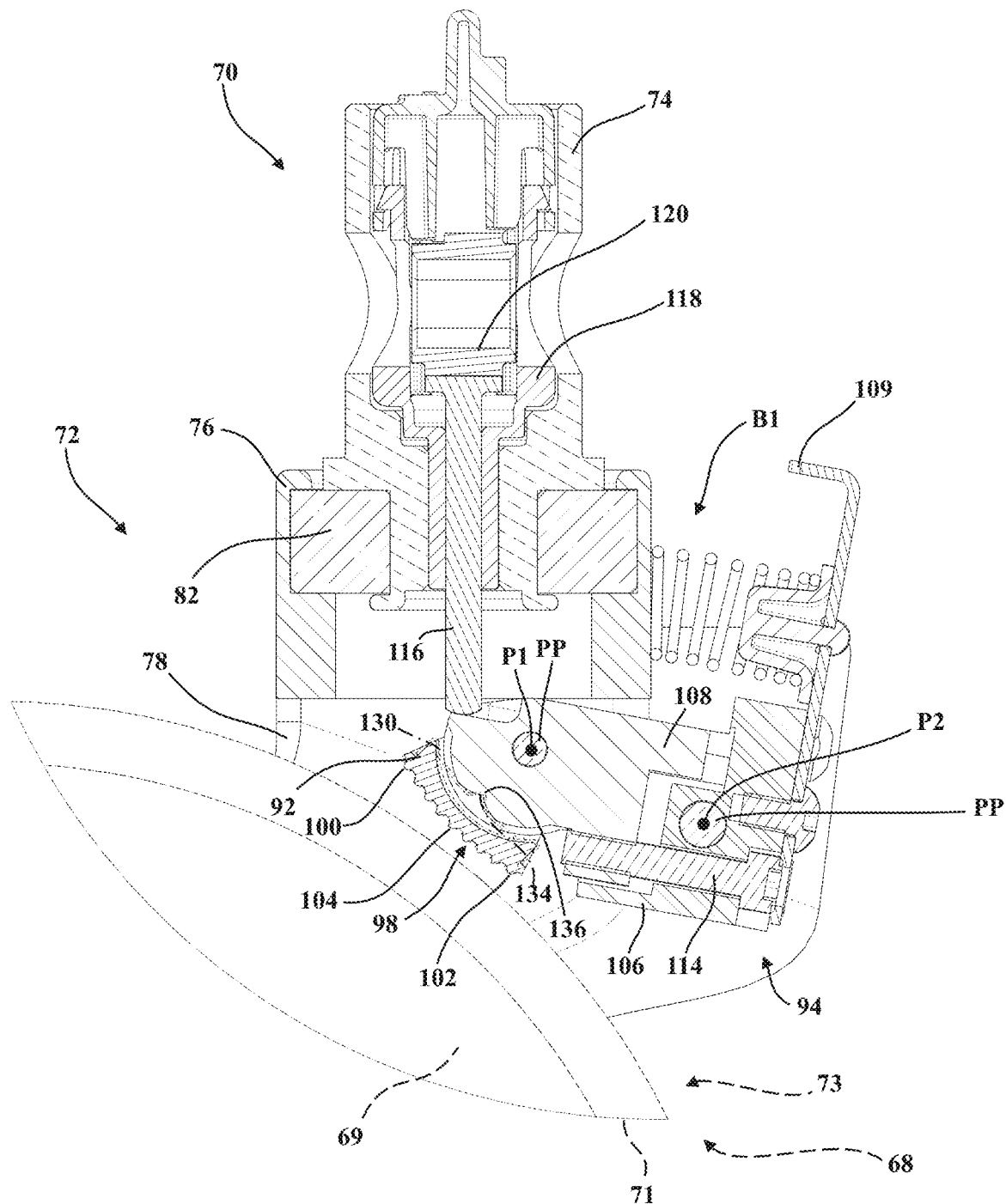
FIGS. 9A-9D are cross-sectional views illustrating operation of the brake assembly.
Figure 9B:
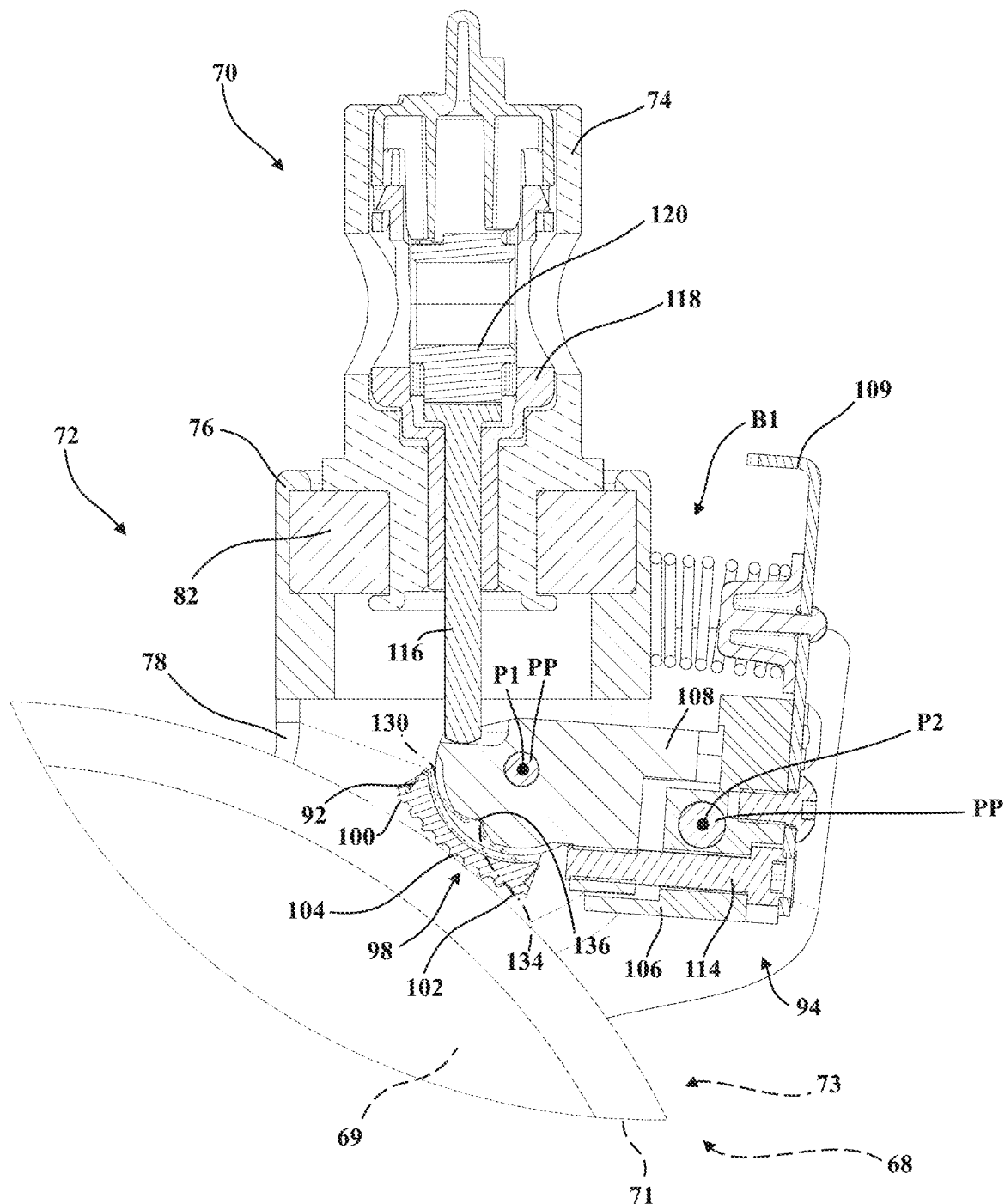
Figure 9C:
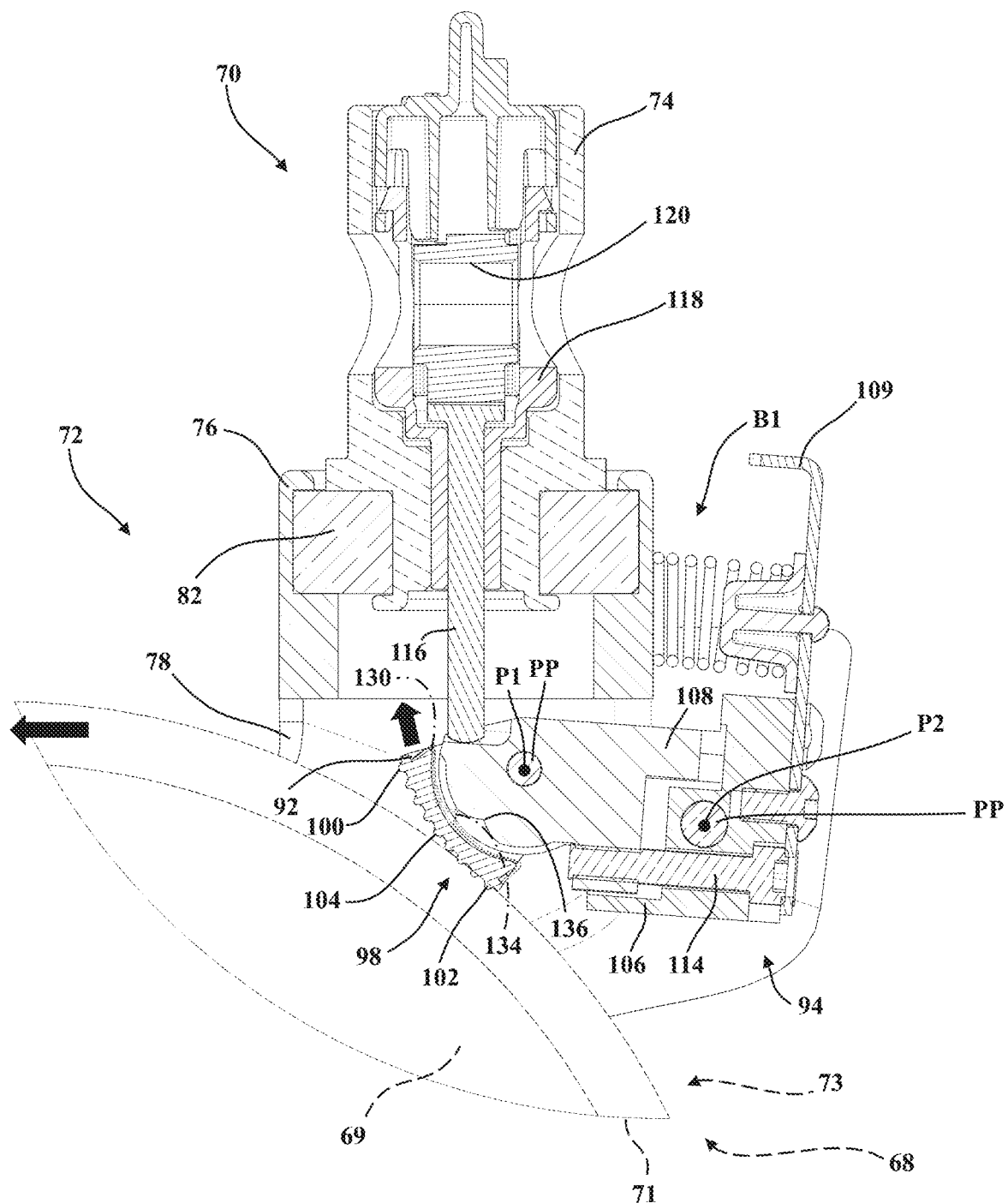
Figure 9D:
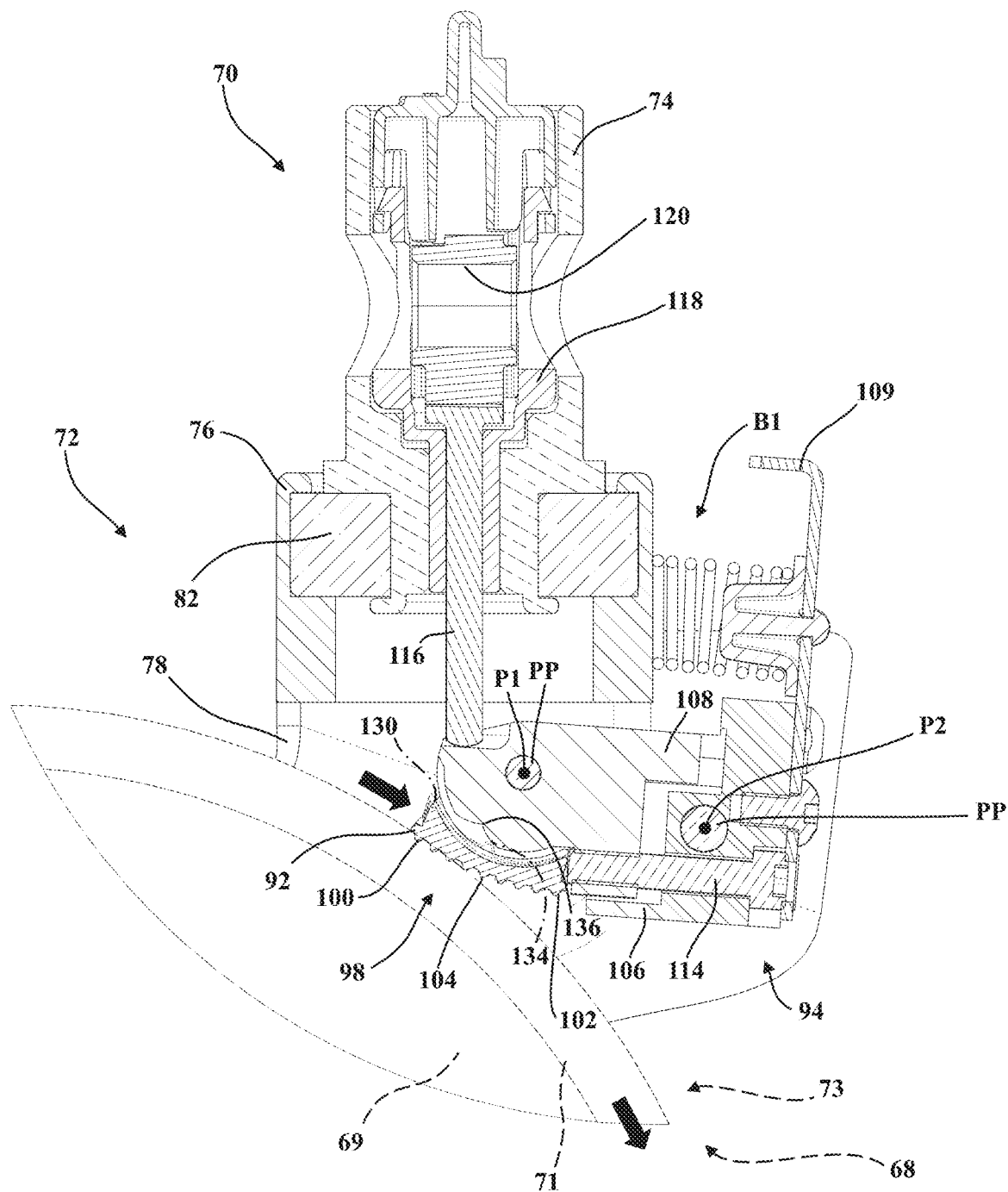

Operation of the brake assembly 90 is illustrated in FIGS. 9A-9D. Notably, the brake 92 is shown as a cross-sectional slice (without depth) in FIGS. 9A-9D to simplify the illustration. In FIG. 9A, the brake 92 is shown in its initial position with respect to the brake shoe 94 about the first pivot axis P1 with the brake 92 being in the unbraked position. Referring to FIG. 9B, the cam 120 has been rotated to drive the plunger 116 distally and pivot the brake shoe 94 and the brake 92 about the second pivot axis P2 until the brake 92 is in contact with the outer surface 73 of the wheel 68. At this point, the cammed wheel engaging surface 98 is only slightly in contact with the outer surface 73 of the wheel 68 as the initial contact section 104 engages the outer surface 73 of the wheel 68, but the cammed sections 100, 102 are spaced from the outer surface 73 of the wheel 68 and out of contact. Thereafter, with reference to FIGS. 9C and 9D, upon the wheel 68 rotating about the rotational axis R in either direction (see arrows), one of the cammed sections 100, 102 then engages the outer surface 73 of the wheel 68 to further arrest rotation of the wheel 68. This occurs by virtue of the cammed wheel engaging surface 98 being in frictional contact with the outer surface 73 of the wheel 68 and the cammed wheel engaging surface 98 being arranged to articulate relative to the wheel support 72 (e.g. pivot about the brake shoe 94 as shown by smaller arrows). When the wheel 68 rotates after the brake 92 is initially placed in the braked position (initial braked position shown in FIG. 9B), the cammed wheel engaging surface 98 more deeply engages the wheel 68 at the cammed sections 100, 102. Referring to FIG. 9C, the wheel 68 has slightly rotated in a counterclockwise direction causing the brake 92 and its cammed wheel engaging surface 98 to pivot clockwise about the first pivot axis P1 as shown. Accordingly, the cammed section 102 engages the outer surface 73 of the wheel 68 to further arrest rotation of the wheel 68 by more deeply engaging the wheel 68 than the initial contact section 104. FIG. 9D shows the same result if the wheel 68 was to slightly rotate in a clockwise direction after initial braking. It should be appreciated that the amount of rolling of the wheel 68 allowed after braking is initiated may vary, but could be less than 10 degrees of rotation, less than 5 degrees, or less than 1 degree before the brake 92 bites sufficiently into the outer surface 73 to prevent any further rotation.

Also note the movement of the return spring 130 in FIGS. 9C and 9D, whereby the projection 134 moves out from the detent pocket 136, but owing to the spring force provided by the return spring 130 when in the positions shown in FIGS. 9C and 9D, when unbraked, the projection 134 returns to the detent pocket 136 as shown in FIG. 9A thereby re-centering the brake 92 on the brake shoe 94 in preparation for the next braking session.

Still referring to FIGS. 9A-9D, the brake assembly 90 described herein requires a lower actuation force to provide sufficient braking because the brake 92 only needs to be placed in initial contact with the wheel 68 by the user (see FIG. 9B), while further braking force is caused by the wheel 68 rotating about the rotational axis R and increasing the frictional engagement between the brake 92 and the wheel 68. Such rotation may be caused by the user, gravity, or the like simply attempting to move the patient transport apparatus 30 (or other mobility apparatus) after the brake assemblies 90 have been set. In other words, the user only need to provide enough force to cause the brake 92 to slightly deform the outer wheel portion 71, while rotation of the wheel 68 causes the brake 92 to pivot about the first pivot axis P1 and further deform the outer wheel portion 71 to further arrest rotation of the wheel 68.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:
1. A caster assembly comprising:
a caster wheel having an outer surface;
a wheel support coupled to the caster wheel to support the caster wheel for rotation about a rotational axis; and
a brake assembly comprising:
a brake shoe;

a brake having a cammed wheel engaging surface shaped to engage the outer surface of the caster wheel, wherein the brake is pivotally connected to the brake shoe about a first pivot axis and the brake shoe is pivotally coupled to the wheel support about a second pivot axis; and a brake actuator to move the brake relative to the caster wheel from an unbraked position to a braked position in which the brake limits rotation of the caster wheel about the rotational axis, wherein the cammed wheel engaging surface is arranged to articulate relative to the wheel support upon the caster wheel rotating about the rotational axis after the brake is initially placed in the braked position such that the cammed wheel engaging surface more deeply engages the caster wheel with rotation of the caster wheel about the rotational axis.

2. The caster assembly of claim 1, wherein the brake shoe comprises a support block and a carrier, wherein the brake is pivotally connected to the carrier about the first pivot axis and the support block is pivotally connected to the wheel support about the second pivot axis.

3. The caster assembly of claim 2, wherein the carrier is movably coupled to the support block so that the carrier is movable relative to the support block to a plurality of brake adjustment positions to adjust a distance between the first pivot axis and the second pivot axis.

4. The caster assembly of claim 3, wherein the support block defines a slide track along which the carrier and brake are slidably supported for adjustment to one of the plurality of brake adjustment positions.

5. The caster assembly of claim 4, comprising a brake position adjuster to adjust the brake to the one of the plurality of brake adjustment positions.

6. The caster assembly of claim 1, wherein the cammed wheel engaging surface comprises opposing cammed sections located at a first distance from the first pivot axis and an initial contact section located at a second distance from the first pivot axis, the second distance being less than the first distance, wherein the brake is arranged in an initial position about the first pivot axis relative to the brake shoe before braking so that when the brake is initially placed in the braked position, the initial contact section is configured to engage the outer surface of the caster wheel and the cammed sections are configured to be spaced from the outer surface of the caster wheel, and thereafter, upon the caster wheel further rotating about the rotational axis, one of the cammed sections engages the caster wheel.

7. The caster assembly of claim 6, wherein the brake assembly comprises a biasing device to bias the brake toward the initial position about the first pivot axis relative to the brake shoe.

8. The caster assembly of claim 7, wherein the biasing device comprises a return spring acting between the brake and the brake shoe to return the brake to the initial position when unbraked.

9. The caster assembly of claim 8, wherein the return spring comprises a torsion spring having spring fingers.

10. The caster assembly of claim 1, wherein the brake assembly comprises a biasing device operatively coupled to the brake to bias the brake toward the unbraked position.

11. The caster assembly of claim 1, comprising a stem, wherein the brake actuator comprises a plunger slidable within the stem to move the brake to the braked position.

12. The caster assembly of claim 11, wherein the brake actuator comprises a cam shaped to engage the plunger to move the plunger upon rotation of the cam about an actuation axis.

13. The caster assembly of claim 1, wherein the wheel support is coupled to the caster wheel to support the caster wheel for swiveling about a swivel axis.

14. A caster assembly comprising:
a caster wheel having an outer surface;
a wheel support coupled to the caster wheel to support the caster wheel for rotation about a rotational axis; and
a brake assembly comprising:
a brake shoe;
a brake having a cammed wheel engaging surface with an arcuate shape to engage the outer surface of the caster wheel, wherein the brake is pivotally connected to the brake shoe about a first pivot axis and the brake shoe is pivotally coupled to the wheel support about a second pivot axis and a distance between the first pivot axis and the second pivot axis is adjustable; and
a brake actuator to move the brake relative to the caster wheel from an unbraked position to a braked position in which the brake limits rotation of the caster wheel about the rotational axis, wherein the cammed wheel engaging surface is arranged to articulate relative to the wheel support upon the caster wheel rotating about the rotational axis after the brake is initially placed in the braked position such that the cammed wheel engaging surface more deeply engages the caster wheel with rotation of the caster wheel about the rotational axis.

15. The caster assembly of claim 14, wherein the brake shoe comprises a support block and a carrier, wherein the brake is pivotally connected to the carrier about the first pivot axis and the support block is pivotally connected to the wheel support about the second pivot axis.

16. The caster assembly of claim 15, wherein the carrier is movably coupled to the support block so that the carrier is movable relative to the support block to a plurality of brake adjustment positions to adjust the distance between the first pivot axis and the second pivot axis.

17. The caster assembly of claim 16, wherein the cammed wheel engaging surface comprises opposing cammed sections located at a first distance from the first pivot axis and an initial contact section located at a second distance from the first pivot axis, the second distance being less than the first distance, wherein the brake is arranged in an initial position about the first pivot axis relative to the brake shoe before braking so that when the brake is initially placed in the braked position, the initial contact section is configured to engage the outer surface of the caster wheel and the cammed sections are configured to be spaced from the outer surface of the caster wheel, and thereafter, upon the caster wheel further rotating about the rotational axis, one of the cammed sections engages the caster wheel.

18. The caster assembly of claim 17, wherein the brake assembly comprises a biasing device to bias the brake toward the initial position about the first pivot axis relative to the brake shoe.

19. The caster assembly of claim 18, wherein the biasing device comprises a return spring acting between the brake and the brake shoe to return the brake to the initial position when unbraked.

20. A caster assembly comprising:
a caster wheel having an outer surface;

a wheel support coupled to the caster wheel to support the caster wheel for rotation about a rotational axis; and a brake assembly comprising:
- a brake shoe having a support block and a carrier movable relative to the support block;
- a brake having a cammed wheel engaging surface shaped to engage the outer surface of the caster wheel, wherein the brake is pivotally connected to the carrier about a first pivot axis and the support block is pivotally connected to the wheel support about a second pivot axis and wherein the carrier is movable relative to the support block to adjust a distance between the first pivot axis and the second pivot axis;
- a brake actuator to move the brake relative to the caster wheel from an unbraked position to a braked position in which the brake limits rotation of the caster wheel about the rotational axis, wherein the cammed wheel engaging surface is arranged to articulate relative to the wheel support upon the caster wheel rotating about the rotational axis after the brake is initially placed in the braked position such that the cammed wheel engaging surface more deeply engages the caster wheel with rotation of the caster wheel about the rotational axis, wherein the cammed wheel engaging surface comprises opposing cammed sections located at a first distance from the first pivot axis and an initial contact section located at a second distance from the first pivot axis, the second distance being less than the first distance, wherein the brake is arranged in an initial position about the first pivot axis relative to the brake shoe before braking so that when the brake is initially placed in the braked position, the initial contact section is configured to engage the outer surface of the caster wheel and the cammed sections are configured to be spaced from the outer surface of the caster wheel, and thereafter, upon the caster wheel further rotating about the rotational axis, one of the cammed sections engages the caster wheel; and
- a return spring acting between the brake and the brake shoe, wherein the brake has a pair of walls and the return spring has opposing spring fingers arranged to engage the walls to bias the brake toward the initial position.

* * * * *